United States Patent [19]

Nicolai

[11] Patent Number: 5,036,300
[45] Date of Patent: Jul. 30, 1991

[54] INTEGRATED CIRCUIT WITH MICROPROCESSOR AND PROGRAMMABLE INTERNAL CLOCK

[75] Inventor: Jean Nicolai, Aix en Provence, France

[73] Assignee: SGS-Thomson Microelectronics S.A., Gentilly, France

[21] Appl. No.: 547,876

[22] Filed: Jul. 3, 1990

[30] Foreign Application Priority Data

Jul. 7, 1989 [FR] France ............................... 89 09196

[51] Int. Cl.[5] .............................................. H03K 3/02
[52] U.S. Cl. ................................. 331/143; 331/177 R;
331/179
[58] Field of Search .................. 331/1 A, 34, 111, 143,
331/175, 176, 177 R, 177 V, 108 C, 179, DIG. 3

[56] References Cited

U.S. PATENT DOCUMENTS 4,691,124 9/1987 Ledzius et al. ...................... 307/303
4,723,114 2/1988 D'Arrigo et al. ............... 331/143 X

FOREIGN PATENT DOCUMENTS 0194205 of 0000 European Pat. Off. .
0296668 of 0000 European Pat. Off. .

Primary Examiner—David Mis
Attorney, Agent, or Firm—Roland Plottel

[57] ABSTRACT

The disclosure concerns the manufacture of integrated circuits and, more precisely, that of integrated circuits containing a signal processor. To be able to make a purely internal clock in an integrated circuit, wherein this clock does not require any external adjusting elements connected to terminals of the circuit, the clock is designed to include an internal oscillator, the frequency of which is adjustable by a register, it being possible for the register to be loaded by the processor. The frequency of the oscillator may be adjusted to compensate for the uncertainty over the natural frequency of the oscillator (which is subject to technological fluctuations). It may also be used to adjust the frequency as a function of an application or of the environment of the circuit. The contents of the register may come from a non-volatile memory containing individual data on the circuit.

2 Claims, 1 Drawing Sheet

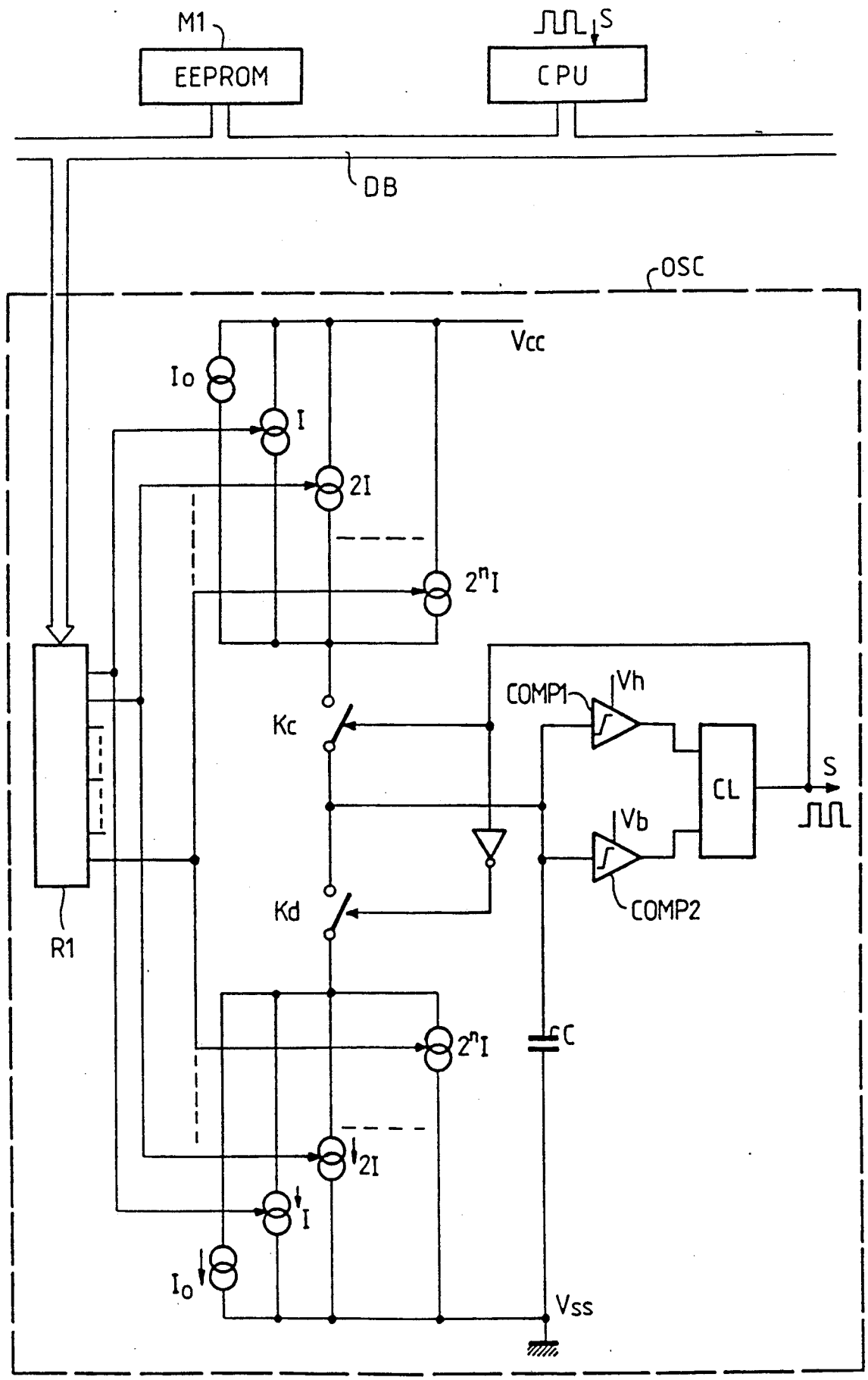

INTEGRATED CIRCUIT WITH MICROPROCESSOR AND PROGRAMMABLE INTERNAL CLOCK

BACKGROUND OF THE INVENTION

1. Field of the Invention

The invention concerns the manufacture of integrated circuits, and more precisely, of integrated circuits having a processor for the processing of signals, namely a circuit capable of performing data-processing operations under control by instructions.

2. Description of the Prior Art

In many integrated circuits, it is necessary to have a clock available. A signal processor, in any case, requires a clock that provides for the smooth sequencing of the processing operations performed.

The clock may be set up by means of an oscillator internal to the integrated circuit, or else the clock signals may be applied from the outside of the integrated circuit, at a terminal specially reserved for this purpose.

The use of an external clock obliges the user of the integrated circuit to provide for this clock, and this indirectly increases the cost of the clock for the user. Furthermore, this makes it necessary to have a circuit terminal reserved for the clock.

When an oscillator is made on an integrated circuit, the difficulty is that of obtaining precisely a desired frequency. In fact, manufacturing variations resulting from the technological processes used are such that it is not possible to obtain a frequency with sufficient precision. The variation in the natural frequency of oscillation for two identical oscillators that have gone through the same production line is easily 100% or even more. This results from the fact that the manufacturing processes involve steps for doping, diffusion of impurities at high temperature, deposition of thin insulator layers etc. It is not very easy to achieve mastery over the reproducibility of these steps from one circuit to the next one.

Either the oscillation frequency is not of vital importance, and then it is possible to accept having an oscillator that is entirely integrated into the circuit, without any external terminal for the reception of a clock signal. Or, on the contrary, the frequency is a vitally important parameter and, in this case, the method generally used is that of connecting, to the exterior of the integrated circuit, elements (generally resistors or capacitors) for adjusting the oscillator present at the circuit. These adjusting elements have a value that is very precisely known, because they are not subject to the same manufacturing variations or else because they have been selected. However, the drawback is that they must be connected directly to the oscillator of the integrated circuit and, consequently, they make it necessary for the integrated circuit to have additional external pins, specially reserved for this purpose. However, the external additional pins should be avoided as far as possible for they are the biggest factors of cost in integrated circuits.

In a signal processor, namely an electronic circuit capable of carrying out various signal processing tasks under control by instructions, the clock that determines the sequencing of the operations carried out by the microprocessor is a very important circuit element and its frequency has to be properly determined. In the signal processing circuits made at present, the clock is external or else it is internal and adjusted by external precise components (quartz elements, resistors, capacitors etc.).

An aim of the invention is to propose an integrated circuit comprising an internal clock that does not suffer the drawbacks just described, and notably the drawbacks resulting from the technological variations among circuits that are identical in theory.

Another aim of the invention is to enable the making of an integrated circuit having a clock, the frequency of which can be defined easily and with precision, without making it necessary to have specific connector pins to connect external adjusting elements to an internal oscillator.

Finally, an aim of the invention is, very specially, the making of a signal processor having a clock to provide for the sequencing of its own operations, said clock having a frequency that can be defined easily by the processor itself.

SUMMARY OF THE INVENTION

To achieve these various aims, the present invention proposes an integrated circuit including a signal processor and an oscillator integrated into the same substrate as the processor, said integrated circuit also including a data register capable of being loaded by the processor, said register controlling the adjusting of the frequency of the oscillator.

Thus, it is possible to use an entirely internal oscillator, and the items of data for adjusting the frequency of the oscillator will be established either in a purely internal way by the processor, for example from the content of the read-only or non-volatile memories made on the same substrate as the processor and the oscillator, or externally, from items of data given to the processor by the exterior. However, in the latter case, unlike what was done in the prior art, these items of data for frequency adjustment will not necessitate any specific connection terminal since they will go through the data input/output terminals of the circuit, which have already been provided necessarily to allow for interfacing between the processor and the exterior.

The invention thus makes it possible to adjust the frequency of a purely internal oscillator to compensate for the frequency errors due to technological variation.

The invention also allows for adjusting the frequency of the oscillator as a function of the user's requirements (depending on the application in which his circuit is placed).

Finally, the invention can be used to adjust the frequency as a function of the environment, for example as a function of the supply voltage of the circuit, and it is quite possible to envisage a situation where the processor itself detects the environmental constraints dictating a change in the frequency of the oscillator. It may be desirable, for example, for the frequency to be reduced when the supply voltage falls excessively.

The invention is particularly useful when the oscillator concerned is precisely the one used to set up clock signals for the working of the signal processor itself.

The oscillator is preferably a relaxation oscillator including a capacitor and current sources for charging and discharging the capacitor, and the register controls the value of the currents for charging and discharging the capacitor. This check is done preferably by a switching over of the current sources. These sources may have values weighted in binary fashion, with the register containing bits weighted in the same fashion.

However, the register may also check the value of the relaxation oscillator, and the check would then be done by the switching over of elementary capacitors in parallel. These capacitors may also have weighted values to facilitate the frequency adjustment.

The register may be loaded, in certain applications, by the processor using an electrically programmable non-volatile memory, made on the same substrate as the oscillator and the processor, and containing frequency correction data. This non-volatile memory may contain individual items of data for the correction of the integrated circuit. These items of data are obtained by testing the integrated circuit after manufacture so as to take account of the fluctuations in technological manufacturing parameters. This approach is particularly valuable because individual items of data for frequency correction, which concern only the circuit, are stored in the integrated circuit itself.

However, the memory may also contain other items of frequency modification data that are related to the method of manufacture of the circuit.

BRIEF DESCRIPTION OF THE DRAWING

Other characteristics and advantages of the invention will appear from the following detailed description made with reference to the appended drawing, wherein the single figure represents a drawing of an embodiment of an integrated circuit according to the invention.

DESCRIPTION OF A PREFERRED EMBODIMENT

The invention shall be described more particularly with reference to the embodiment of an integrated circuit including a microprocessor and using an oscillator OSC to define a clock frequency used for the sequencing of the tasks performed by the microprocessor.

The oscillator is entirely integrated into the same semiconductor substrate as the microprocessor. It is an oscillator with variable frequency. The frequency can be adjusted under the control of a register R1, the contents of which can be loaded by the microprocessor.

The microprocessor has been shown only very partially in the figure. In a standard way, it includes a central processing unit CPU connected to a data bus (or address and data bus) DB enabling the exchange of data notably with the memories (random-access, read-only or non-volatile memories), input/output ports of the integrated circuit and internal registers of the integrated circuit.

Among the memories connected to the bus DB, there is provision for an electrically-programmable memory M1, preferably an electrically-erasable programmable read-only memory (EEPROM). However, this memory may be one that is not electrically erasable.

The memory M1 may have various uses in the circuit, i.e. it is not specially reserved for the adjusting of frequency according to the invention. In this case, a specific zone of the memory will be reserved so as to contain, according to the invention, items of data pertaining to the frequency that the oscillator should have.

Among the registers connected to the bus DB, there is provision for a specific register R1 designed to contain, during operation, items of data related to the data contained in the memory M1. It is the register R1 that controls the automatic adjusting of the frequency of the oscillator. Further below, we shall describe the way in which this adjusting is done.

At the end of the manufacture of the integrated circuit, it is usual to conduct tests. In particular, final tests are done after the encapsulation of the circuit in a package, when only the external access pins of the integrated circuit remain accessible. Among these tests, a measurement is made of the natural frequency of the oscillator OSC. The difference existing between the frequency of the oscillator and the desired frequency is deduced therefrom, this difference being due to the uncontrollable fluctuations in the parameters of the various technological manufacturing steps (times, temperatures, doses, etc.).

A command is then given to store an item of information, corresponding to this difference, in the memory M1. The microprocessor can do this storage itself.

During the use of the circuit, this item of information is used for the systematic correction of the frequency of the oscillator so that it actually takes the desired value.

For example, provision may be made so that that turning the power on in the integrated circuit will prompt a systematic step for the transfer, into the R1, of the corrective information contained in the memory M1. Since this transfer is done by means of the microprocessor which is capable of making computations, it is moreover quite possible to provide for the placing, in the register R1, not just of the contents stored in the memory M1 but of data computed by the microprocessor from the contents of the memory M1.

As long as the microprocessor remains supplied with power, the register R1 preserves this data and permanently corrects the frequency of the oscillator OSC.

Should the oscillator be the one that enables the clock signals of the microprocessor to be set up, it is preferable for the oscillator to work, at the outset, with a relatively low frequency. For this purpose, at the outset, when the power is turned on, it will be seen to it that the register R1 is systematically reset at zero (this is generally what is done by initializing circuits in all microprocessors) and provision will be made for the zero content of the register to correspond to a relatively low frequency. The starting-up program of the processor will then load the register to obtain the desired working frequency.

With one correction eight-bit byte, it is possible to correct the frequency, for example, by steps of 2% in a range of technological fluctuations of about 200%.

It is also possible to make provision for the frequency adjustment not to be done systematically or else for it to be not related (or not exclusively related) to the technological parameters of manufacture of the integrated circuit. In fact, the invention allows for having an oscillator frequency that is variable as a function of any criterion whatsoever. It is enough for the microprocessor to receive an instruction for the modification of frequency. It then places the frequency correction value, indicated to it, in the register R1. The frequency correction is done without using any external components and, in any case, it is done using only the data input/output terminals necessarily present in the integrated circuit.

In one exemplary application, it is possible to envisage the correction of the frequency as a function of the temperature or, again, as a function of the value of the supply voltage of the integrated circuit. However, it is also possible to make a correction according to the user's requirements, whatever these may be.

The oscillator OSC shown in the figure is a relaxation oscillator using a capacitor C that can be charged by an adjustable charging current i and discharged by a discharging current that is preferably equal to the charging current and has the contrary sign.

The entire oscillator is supplied between two supply terminals, one of which is at a low potential Vss while the other is at a high potential Vcc.

The charging current is produced by a set of several current sources connected between Vcc and the capacitor (the latter, besides, has one terminal at Vss). These current sources may be placed in parallel under the control of the register R1, as a function of the pieces of data contained in this register, to obtain a charging current of variable value.

In the same way, the discharging current is produced by a set of current sources connected to the terminals of the capacitor. These sources may be connected in parallel under the control of the register R1, as a function of the pieces of data contained in this register, to set up a discharging current of variable value.

The simplest approach lies in the use of a binary weighting system, wherein the bits stored in the register R1 are placed in rising order of their weighting or significance, and each bit controls a current source with a corresponding weighted value. Thus, the first bit of the register (the least significant bit) may control a charging current source with a value I and, simultaneously, a discharging current source with the same value I. The second bit of the register controls a charging current source with a value 2I and a discharging current source with a value 2I, and so on and so forth, the $n^{th}$ bit controls a charging current source and a discharging current source with a value $2^n I$.

Thus, depending on the contents of the register, we obtain a charging and discharging current i that is variable between 0 and $(2^{n+1} - 1)I$, in steps equal to I. This current may be the main charging and discharging current or it may be placed in parallel with a basic charging or discharging current I0, in which case the register is used to correct the value of this current I0 (the charging current being I0 when the contents of the register are zero).

The charging current i, formed by the sum of the current I0 and the currents individually put into operation by the register, is transmitted to the capacitor C by means of a switch Kc that is closed only during the charging of the capacitor.

Reciprocally, the discharging current i is transmitted by means of a switch Kd that is closed only during the discharging.

The switches Kc and Kd are switched over in phase opposition by threshold comparators COMP1 and COMP2 connected to the capacitor. The threshold comparator COMP1 has the function of interrupting the charging of the capacitor and starting up its discharging when the voltage at its terminals reaches a high threshold Vh. The comparator COMP2 has the function of interrupting the discharging of the capacitor and recommencing the charging when the voltage at the terminals of the capacitor reaches a low threshold Vb. A logic circuit CL (RS type flip-flop circuit) receiving the outputs of the comparators gives the control signals of the switches Kc and Kd. The output S of this logic circuit CL is the output of the oscillator OSC. It gives square wave pulses at a frequency that is related to the value (adjustable by the register R1) of the charging and discharging current, to the value of the capacitor C and, finally, to the value of the difference between the high and low thresholds, Vh and Vb, of the comparators COMP1 and COMP2.

If the technology is such that the currents I and I0 depend on the value of the supply voltage Vcc, the comparators COMP1 and COMP2 may be designed to be built out of current sources made in the same way as the charging and discharging current sources I0, I, 2I, etc. More precisely, the comparators COMP1 and COMP2 are designed to be built so that the difference in thresholds Vh-Vb remains proportional to the current I of an elementary current source when the supply voltage varies. In this way, the duration of the charging and discharging becomes independent of the voltage Vcc. If the charging is slower because the current is weaker, the difference in voltage Vh-Vb which, with the current, defines the duration of the charging, will be proportionally smaller and, in its totality, the period of the oscillator will not change.

If the register R1 is used essentially to receive a frequency correction related to technological fluctuations, it is by this register that the value of the capacitor C (subject to technological fluctuations) will be taken into account.

What is claimed is:

1. An integrated circuit including a processor and an oscillator integrated into the same substrate as the processor, said integrated circuit also including a data register capable of being loaded by the processor, said oscillator acting as a clock for the processor and being a relaxation oscillator including a capacitor and current sources for charging and discharging the capacitor and the register controlling the value of the currents for charging and discharging the capacitor to adjust the frequency of the oscillator, wherein the register is loaded by the processor from an electrically programmable nonvolatile memory, made on the same integrated circuit substrate and containing a frequency correction data.

2. An integrated circuit according to claim 6, wherein the nonvolatile memory contains individual pieces of data for the correction of the integrated circuit, these pieces of data being obtained by the testing of the integrated circuit after manufacture, so as to take account of the fluctuations of manufacturing parameters of the circuit.

* * * * *